Jan. 31, 1939.   A. B. RYPINSKI   2,145,557
METER TROUGH
Filed June 19, 1937   4 Sheets-Sheet 1

INVENTOR
Albert B. Rypinski
BY
George T. Gill
ATTORNEY

Jan. 31, 1939.  A. B. RYPINSKI  2,145,557
METER TROUGH
Filed June 19, 1937  4 Sheets-Sheet 3

INVENTOR
Albert B. Rypinski
BY
George F. Gill
ATTORNEY

Jan. 31, 1939.   A. B. RYPINSKI   2,145,557
METER TROUGH
Filed June 19, 1937   4 Sheets-Sheet 4

INVENTOR
Albert B. Rypinski
BY
George F. Gill
ATTORNEY

Patented Jan. 31, 1939

2,145,557

UNITED STATES PATENT OFFICE 2,145,557

METER TROUGH

Albert B. Rypinski, Laurelton, N. Y., assignor to Metropolitan Device Corporation, a corporation of New York

REISSUED
OCT 21 1941

Application June 19, 1937, Serial No. 149,120

6 Claims. (Cl. 247—2)

The invention herein disclosed relates to a meter trough and in particular to a meter trough that is especially suitable for the socket type of watt hour meter that is commonly used for measuring the consumption of electricity. While certain of the features of the invention are especially suitable to mounting a plurality of such meters, the invention is not limited to a multiple meter trough, as certain features of the invention are suitable to a meter trough for a single meter.

In electrical installations serving buildings having several independent consumers, it is the usual practice to mount the several meters, one for each consumer, upon a common meter board. With polyphase distribution systems that are now generally used, it is common practice, where several meters are mounted together, to balance the circuit at the service connectors and it is an object of this invention to provide a completely enclosed multiple meter trough having a system of main and sub-busses which lend themselves to connection for the purpose of balancing the circuit.

Another object of the invention is to provide a meter trough of this type in which each meter unit is complete in itself and in which the units are removable and interchangeable.

A further object of the invention is to provide a meter trough of this type that is simple in construction and in which solderless connectors are used throughout for the purpose of connecting the service mains to the meter sockets and the meter sockets to the load wires and interconnecting the several meters in a multiple meter trough.

A meter trough embodying the invention and in which the foregoing objects and certain advantages that will hereinafter appear are realized, is illustrated in the accompanying drawings in which:

Fig. 6 is a plan of a part of a meter socket.

Figure 1:
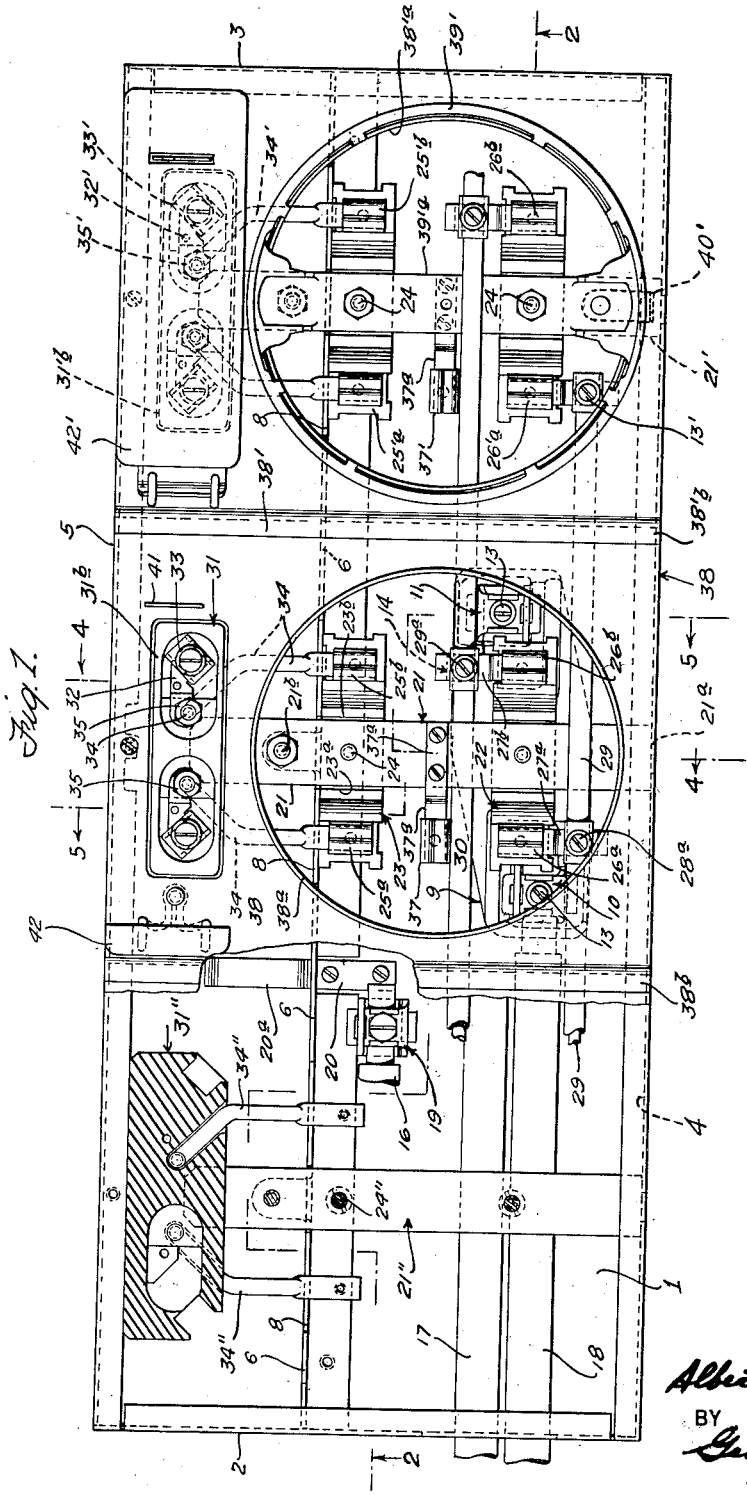
Fig. 1 is a plan of a meter trough, with certain parts removed, suitable for three meters of the socket type.
Figure 2:
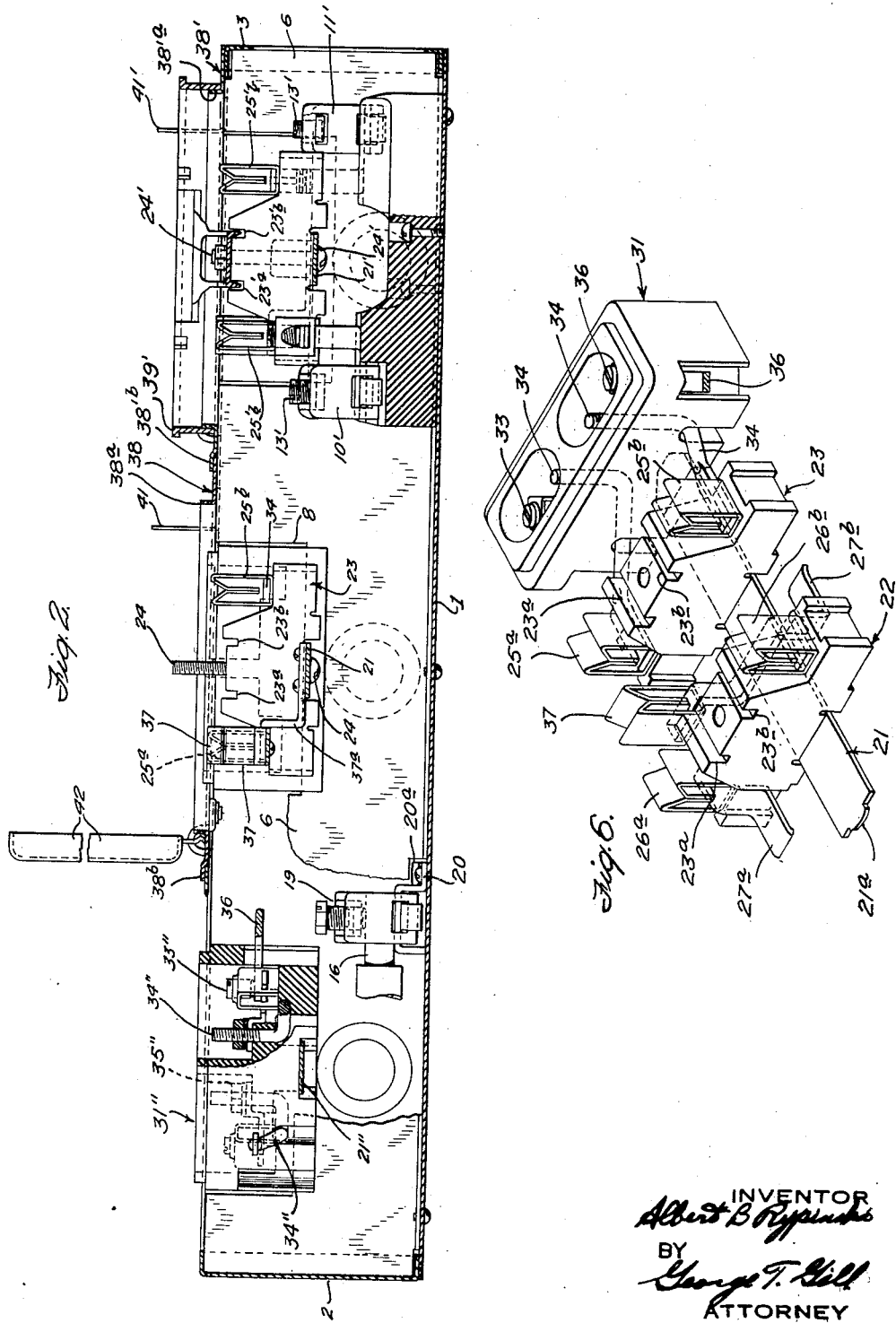
Fig. 2 is a longitudinal section taken on the irregular line 2—2 of Fig. 1.
Figure 3:
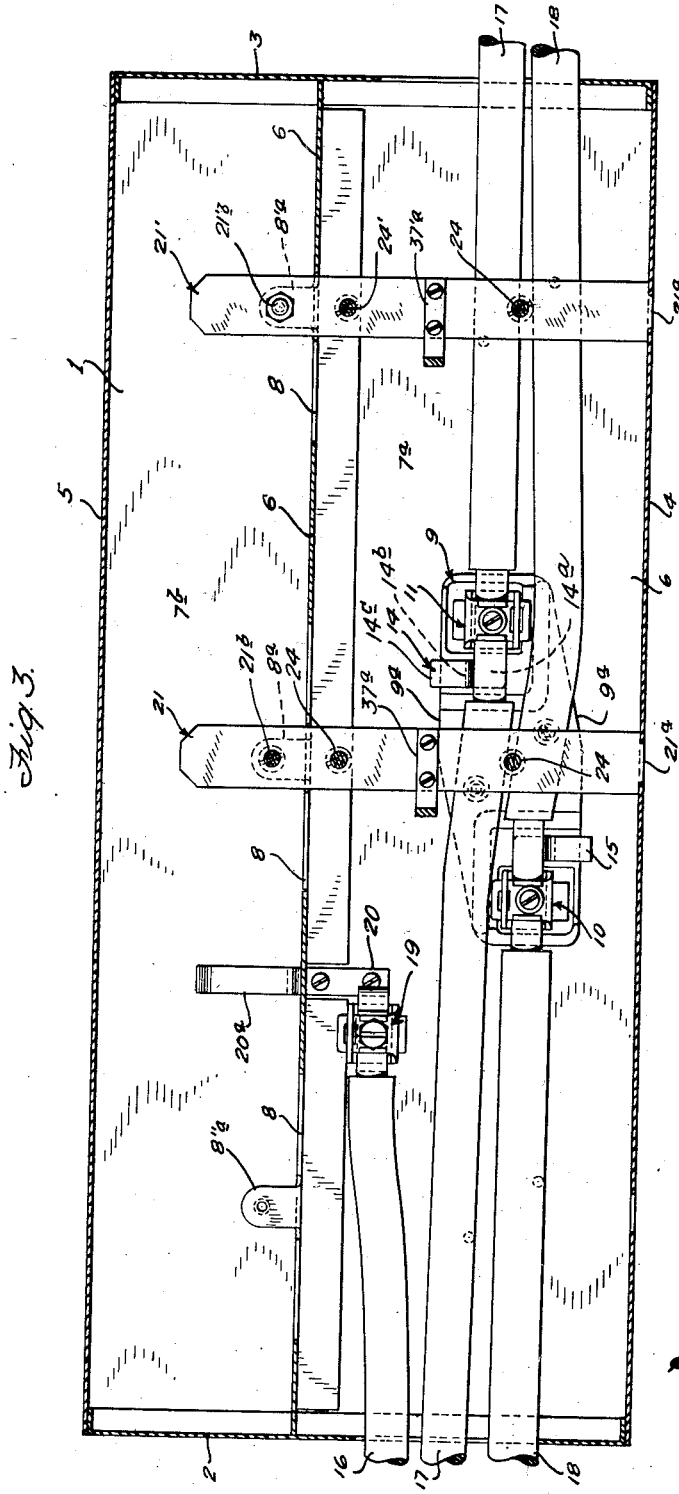
Fig. 3 is a plan of the trough with parts removed.

The meter trough illustrated in the drawings includes a sheet metal trough having a bottom wall 1, end walls 2 and 3, and side walls 4 and 5.

The meter trough is opened up at the upper end thereof and the side and end walls are bent laterally to form a circumambient flange. The trough is rectangular in plan and within the trough there is a longitudinal partition 6 that divides the trough into a service compartment 7a and a load compartment 7b. The partition 6 has a plurality of spaced sections 8, three in number, that are of lesser width than a side wall of the compartment or the other portions of the partition.

Figure 5:
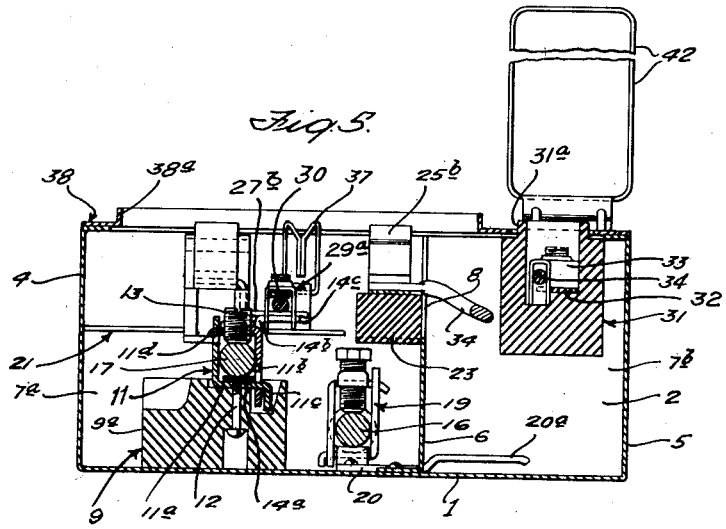
Fig. 5 is a transverse section taken on the irreg-
50 ular line 5—5 of Fig. 1 with the meter collar removed.

Within the service compartment 7a, and adjacent the central section of the partition 8 of lesser width, there is mounted a connector block 9. The connector block 9 includes a base 9a that is formed from electrical insulating material. This base is secured to the bottom wall 1 of the trough, and mounted on the base there are a pair of solderless electrical connectors 10 and 11. The solderless connector 11, as seen in Fig. 5, includes an L-shaped strip metal piece 11a that is secured to the connector block by a screw 12. This L-shaped piece 11a has one flange thereof secured to the connector block and the other flange extends substantially perpendicular to the surface of the block or to the bottom wall 1 of the trough. An inverted L-shaped piece 11b is pivotally secured to the piece 11a on an extension 11c of the member 11a that extends through a slot in the member 11b. The member 11b has a tongue 11d that fits into a corresponding slot in the member 11a. Through the member 11b, a set screw 13 is threaded. For inserting a wire, the portion 11b is released from the portion 11a and swung about its pivotal connection thereto. The wire is then laid in the connector between the members 11a and 11b and the portion 11b is moved about its pivot so that the tongue 11d extends through the slot in the portion 11a. In this position, the connector forms a substantially rectangular tubular member through which the electric wire extends. When the set screw 13 is tightened on the wire, the wire is forced into contact with the side walls of the connector and mechanically and electrically secured and connected to the connector.

Cooperating with the connector 11 there is a strip metal electrical conductor 14. This conductor has a section 14a that is received in the solderless connector 11 and secured to the base thereof by the machine screw 12. The conductor 14 also has a vertically extending section 14b and a lateral section 14c at the upper end of the vertical section 14b. The connector 10 is similar in all respects to the connector 11 and a strip conductor 15 cooperates with the connector 10 and is of the same type and shape as the strip conductor 14. These solderless connectors are illustrated and described in greater detail in the copending application of Albert B. Rypinski, Serial No. 123,835, filed February 3, 1937. It will be seen from the foregoing that the service wires are through the connectors 10 and 11 electrically connected to the conductors or bus bars 14 and 15.

In an installation, the service wires 16, 17 and 18 pass through an opening in the end wall of the trough. The portion of the wires 17 and 18 at the connectors 11 and 10 respectively are bared and secured in the connectors as previously described, the conductor 18 being mechanically and electrically connected to the connector block 9 by the connector 10 and the conductor 17 being connected to the connector block by the solderless connector 11. If the meter trough be the last in a line or the only one in the building, the supply wires may terminate at the connector block 9. If on the other hand they are to supply additional circuits they may proceed straight through the supply compartment 7a and out through the opposite end wall.

The conductor 16, which is the neutral or ground conductor of a three-wire, single-phase system, is electrically and mechanically connected to the base 1 of the meter trough by a solderless connector 19 that is secured to the base of the meter trough. The conductor 16 is thus grounded. In conjunction with this ground, there is provided a ground strip conductor or bus-bar 20 that is secured to the base 1 of the meter trough, passes through an opening through the partition 6, and that has a section 20a that is offset from the base 1 of the trough.

Extending transversely of the meter trough, there are three bridge elements 21, one for each of the sections 8 of the partition 6. At the center of each section 8, there is formed a lateral flange 8a. The bridge element 21 consists of a strip of heavy sheet metal and on one end there is formed a tongue 21a of lesser width than the strip. This tongue 21a is received in a slot formed in the side wall 4 of the service compartment 7a. The strip extends transversely of the trough and rests upon the edge of the section 8 and the flange 8a, the strip wholly traversing the service compartment and extending into and slightly beyond the central longitudinal line of the load compartment. The bridge element is secured to the flange 8a by a bolt 21b.

Each bridge element forms a support for a meter socket. Since the three meter sockets are identical in construction, only one, the central meter socket, will be described. This one is shown more in detail in Fig. 6. Similar parts of the other meter socket are, however, indicated by corresponding numerals, primed in one instance and double primed in the other. The meter socket includes the bridge element 21 and two spaced blocks of insulating material 22 and 23. The block 23 is shaped as illustrated and secured to the bridge element 21 by a bolt 24. The block carries a pair of clip connectors 25a and 25b, one on each side of the bridge element. The upper edge of the block has a pair of spaced grooves 23a and 23b. The block 22 is similar in all respects to the block 23 and carries a pair of meter-contact jaws 26a and 26b. Beneath each of the meter-contact jaws 26a and 26b there is secured a strip conductor, 27a and 27b respectively. These strip connectors extend, when the meter socket is in position in the trough, substantially parallel to the base of the trough and they are positioned so that the strip conductor 27a bears against the lateral extension of the strip connector 15 extending from the connector block 9 and connected to the conductor 18 and the strip connector 27b contacts with and bears against the lateral extension of the strip conductor strip 14 extending from the connector block 9. The lateral extension of the strip connectors 15 and the strip connector 27a are secured together by a solderless connector 28. This solderless connector effects a mechanical and electrical connection between these two strip conductors and a wire or sub-bus 29. The connector 28 is in the shape of an inverted U having openings in the legs thereof. In these openings the strip conductors 27a and 15 are received and the sub-bus 29 extends through the connector parallel to the side walls thereof. The sub-bus 29 and the strip conductors are mechanically secured together and electrically connected through a set screw 28a which extends through the base of the inverted, U-shaped solderless connector and securely clamps the three conductors together. A similar solderless connector 29a secures the strip conductors 14, 27b and a sub-bus 30 together. The sub-busses 29 and 30 extend along the trough longitudinally thereof and are connected to the corresponding strip conductors of each of the meter sockets in the trough, there being three meter sockets in the trough disclosed in the drawings. The sub-busses are connected to the strip conductors of the other meter sockets through similar solderless connectors.

It is to be noted that there is but one service connector block for the several meter sockets in the trough. The service mains or conductors are connected to the meter socket directly thereover and the service current is distributed to the several other meter sockets through the sub-busses as described.

Figure 4:
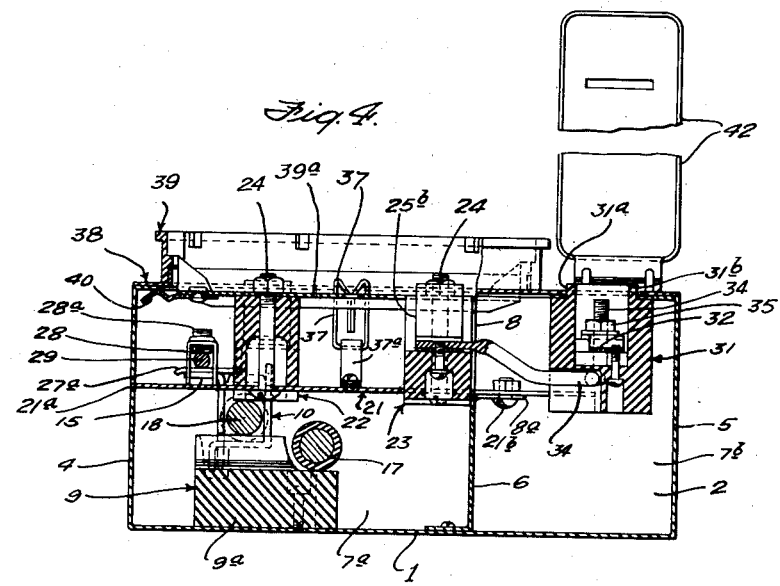
Fig. 4 is a transverse section taken on the irregular line 4—4 of Fig. 1 and having the meter collar in place.

On the end of the bridge element 21 that extends into the service compartment of the meter trough, there is mounted a connector block 31. This connector block consists of a base of insulating material that is mounted upon the bridge element. The block has a reduced portion 31a that extends slightly above the lateral flange of the side wall of the service compartment. One of the shoulders, that adjacent the side wall of the compartment, formed by reducing the cross-sectional area of the block to form the extension 31b, abuts against the inner side of the lateral flange of the side wall and the block 31 is thus rigidly secured between the bridge element and the flange of the side wall. The block has two oblong recesses as seen in Figs. 1, 4 and 5. In each recess, secured to the base thereof, there is a conducting strip 32 on one end of which there is mounted a solderless connector 33 and to the other end of which there is connected a conductor 34. The conductor 34 is also connected to the meter-contact jaw 25b of the meter socket conductor on the meter socket block 23. The conductor 34 is a solid piece of metal throughout, one end being flattened to fit under the meter-contact jaw 25b and the other end, which extends vertically upward through the base of the block 31, being threaded to receive a nut 35. The threaded end of the conductor 34 extends through the conductor strip 32 and is secured and electrically connected thereto by the nut 35. A similar arrangement is provided in the other recess of the block 31 and the connecting strip therein is connected by a similar conductor to a meter-contact jaw 25a on the block 23. To the solderless connectors in these recesses the load wires are connected.

For the purpose of entering the load wires into the recess in the block, the corner of the block is slotted as shown in Fig. 6 at the corner thereof and through this slot the load wire 36 enters the recess and the solderless connector. Proper knockouts are provided in the side wall of the load compartment through which the load wires enter the load compartment.

The four meter-contact jaws mounted on the two blocks secured to a bridge element 21 together with a clip connector 37, that is directly secured and electrically connected through a strip 37a to the bridge element 21 and forms the ground connection for the meter, constitute the clip connectors for the meter. There is thus mounted on the bridge element five meter-contact jaws adapted to receive the blades of a socket type meter which are positioned to correspond to the position of these meter-contact jaws.

The ground connection for the service lines may be made to the bus 20 at the section 20a. These connections are in like manner made through a solderless connector. The section 20a is of sufficient length to receive three solderless connectors, one for each of the load circuits served by the meters.

A separate cover plate 38 is provided for each section of the meter trough that includes a meter socket. Each of these cover plates is identical in construction and includes a flat strip of sheet metal having a circular opening therethrough with a circumambient lateral flange 38a formed thereon. Surrounding this flange and secured to the cover, there is a cast metal collar 39 that has a diametrical, substantially channel-shaped member 39'a integral therewith and below the level of the under side of the cover plate. One edge 38b of the cover plate is offset so that it extends over the edge of the succeeding cover plate. When the cover plate is in position, the flanges of the diametrical member 39'a are received in the slots corresponding to the slots 23a and 23b in the blocks carrying the meter-contact jaws. The diametrical member has openings therethrough to receive bolts 24 which extend through the insulating blocks carrying the clip connectors. The blocks carrying the meter-contact jaws and the cover for each meter socket are thus secured together to the bridge elements by the bolts. On the lower surface of the diametrical member there is provided a metal strip 40 which extends under the lateral flange on the side wall of the meter trough. The cover for each section is thus secured in place.

Through the cover there is formed a rectangular opening that receives the extension 31b of the load connector block 31. On one end of this opening there is provided a laterally extending latch member 41 having an opening therethrough. At the other end of this opening through the cover plate, there is pivotally secured a cover 42 for the opening, the cover 42 having an opening through which the member 41 is received in the closed position thereof. When the cover is opened, access may be had to the connections made at the load connector block. Service may thus be disconnected without removing the meter from the meter trough. In the closed position of the cover 42, a seal may be put through the opening in the member 41 and the cover thus sealed in the closed position. It will be noted that with the cover plates 38 in place, and the meters on the meter trough, the connections to the load wires are the only connections that are accessible.

From the foregoing it will be seen that there is provided by this invention a meter trough that is divided into a service and a load compartment; there is provided a construction in which each meter socket is a separate removable unit that may be replaced or interchanged; and there is provided a service connector block and main service cables and sub-busses extending from the connector block to the various meter sockets. The whole forms a simple rigid construction which facilitates the installation of meters and the interconnection and distribution of electricity between independent consumers from common service mains. Furthermore, all connections are made through solderless connectors which are easily and readily mounted or demounted so that the whole construction provides a flexible construction, all parts of which are readily interconnected, changed or replaced.

The particular embodiment of the invention disclosed in the drawings and described above is particularly suitable to a multiple meter trough where the service mains are of large carrying capacity. It will be noted that the distribution of the current takes place immediately at the tap from the service mains. Thus, in the meter trough illustrated the current is distributed to the load served by the central meter at the tap and through the sub-busses on each side to the other meters. The sub-busses thus need be only one-third of the capacity of the service mains.

The arrangement provides a mounting for a plurality of meters of relatively heavy current capacity in a relatively small space. Likewise, the branch conductors from the main service wires are so short, it is not necessary, as is usually required, to place fuses between the main service wires and the branch conductors; the fuses on the load side of the meter are adequate as they are close to the branching point. The removable feature of the meter sockets and sub-busses provides ready access to installing the service cables in the limited space available in meter troughs. This is an important advantage, particularly when large service cables are required. The simplicity and compactness of the specific arrangement for making connections between the service cable and the sub-busses is also an important feature of the invention.

It will be obvious that various changes may be made by those skilled in the art in the details of the embodiment of the invention as disclosed in the drawings and described above within the principle and scope of the invention as expressed in the appended claims.

I claim:

1. A meter trough of the type described comprising a sheet metal trough, a longitudinal partition in the trough dividing the trough into a service compartment and a load compartment, the partition having a section of lesser height than the side walls of the trough, a connector block mounted in the service compartment, including a base of insulating material and connectors for electrically connecting to service mains, a bridge element extending from the side wall of the service compartment and supported by the section of the partition section of lesser height, a connector block mounted in the load compartment of the trough including a base of insulating material and electrical connectors for electrically connecting load wires thereto, a meter socket mounted within the service compartment on said bridge element including clips to receive the blades of a socket type meter, electrical conductors connecting the service connectors to certain of said clips, and other electrical conductors connecting certain other of said clips to said load connectors.

2. A meter trough of the type described comprising a sheet metal trough, a longitudinal partition in the trough dividing the trough into a service compartment and a load compartment, the partition having a section of lesser height than the side walls of the trough, a connector block mounted in the service compartment, including a base of insulating material and connectors for electrically connecting to service mains, a bridge element extending from the side wall of the service compartment and supported by the partition section of lesser height, a connector block mounted in the load compartment of the trough including a base of insulating material and electrical connectors for electrically connecting load wires thereto, a meter socket mounted within the service compartment on said bridge element including clips to receive the blades of a socket type meter, a strip electrical conductor extending from certain of said clips, a like number of strip conductors extending from said service connector block and positioned to engage the strips extending from the clips, a solderless connector for securing connecting strips together, and electrical conductors connecting certain other of said clips to said load connectors.

3. A meter trough of the type described comprising a sheet metal trough, a longitudinal partition in the trough dividing the trough into a service compartment and a load compartment, the partition having a series of spaced sections of lesser width than a side wall of the trough, a connector block mounted on the base of the trough in the service compartment, a plurality of bridge elements one for each of the partition sections of lesser width, each bridge element extending from the side wall of the service compartment and across the edge of a partition section of lesser width, a meter socket mounted within the service compartment on each bridge element including an insulating block and clip meter connectors mounted thereon, strip electrical conductors extending from said meter sockets and connected to certain of the clips thereof, strip electrical conductors extending from said service connector block and positioned to contact with the strip connectors extending from one of said meter sockets, and busses electrically connecting similar strip conductors of the several meter sockets together.

4. In a meter trough of the type described, the combination comprising a sheet metal trough-shaped case, a partition within the case forming a service compartment and a load compartment, the partition having a section of lesser width than a side wall of the trough, and a removable meter socket including a bridge element extending from the side wall of the service compartment and resting upon the edge of the section of the partition of lesser width, a pair of blocks of insulating material mounted on the bridge element, and connector clips for receiving the blades of a socket type meter mounted on the blocks of insulating material.

5. In a meter trough of the type described, the combination comprising a sheet metal trough-shaped case, a partition within the case forming a service compartment and a load compartment, the partition having a section of lesser width than a side wall of the trough, and a removable meter socket and service connector block within the meter trough including a bridge element extending from the side wall of the service compartment and into the load compartment, the bridge element resting upon the edge of the section of the partition of lesser width, a pair of blocks of insulating material mounted on the bridge element over the service compartment, a pair of connector clips for receiving the blades of a socket type meter mounted on each block, a load connector block mounted on the bridge element in the service compartment of the trough, and conductors connecting the adjacent clip connectors of the meter socket to the load connector block.

6. A meter trough of the type described comprising a sheet metal trough, a longitudinal partition in the trough dividing the trough into a service compartment and a load compartment, the partition having a section of lesser height than the side walls of the trough, a bridge element extending from the side wall of the service compartment, overhanging the section of the partition of lesser height and extending into the load compartment, a meter socket mounted within the service compartment on said bridge element, and a load connector block within the load compartment mounted on said bridge element.

ALBERT B. RYPINSKI.